United States Patent [19]
Miller et al.

[11] 3,736,442

[45] May 29, 1973

[54] REGENERATIVE SWEEP CIRCUITS USING FIELD EFFECT TRANSISTORS

[75] Inventors: Steven Gary Miller, Highlands, N.J.; Leonard Strauss, New York, N.Y.

[73] Assignee: Bell Telephone Laboratories, Incorporated, Murray Hill, N.J. ; by said Strauss

[22] Filed: June 16, 1971

[21] Appl. No.: 153,735

[52] U.S. Cl. ..................307/228, 328/128, 328/181, 307/251

[51] Int. Cl. ..............................................H03k 4/08

[58] Field of Search......................307/228, 205, 251, 307/279, 304; 328/127, 128, 181, 183, 184, 185

[56] References Cited

UNITED STATES PATENTS

| | | | |
|---|---|---|---|
| 3,023,321 | 2/1962 | Isabeau | 307/299 |
| 3,569,735 | 3/1971 | Lavender | 328/184 |
| 2,578,982 | 12/1951 | Potier | 328/183 |
| 3,506,851 | 4/1970 | Polkinghorn | 307/251 |
| 2,701,306 | 2/1955 | Bess | 328/184 |
| 2,775,694 | 12/1956 | Blumlein | 328/128 |
| 2,976,427 | 3/1961 | Armanini | 307/228 |
| 3,049,625 | 8/1962 | Brockman | 307/228 |

OTHER PUBLICATIONS

Lohman "Some Applications of MOS to Switching Circuits" May 1964 SCP and Solid State Technology pages 31–34

Csanky "Mor Snap in logic Circuits with FET," Electronics June 14, 1963, pages 43–45

Nasa Tech Brief "Input Gate Circuit Converter for Use as Linear Amp" Brief 68–10015 January 1968

*Primary Examiner*—John W. Huckert
*Assistant Examiner*—R. E. Hart
*Attorney*—R. J. Guenther and William L. Keefauver

[57] ABSTRACT

Regenerative sweep circuits for developing a Miller sweep output voltage are disclosed. Three circuits are utilized, each employing three connected field effect transistors which interact in response to a trigger pulse to switch the circuit from a steady state into a Miller sweep region and then, after a preselected period of time, to switch the circuit automatically back to its steady state.

22 Claims, 6 Drawing Figures

Patented May 29, 1973 3,736,442

3 Sheets-Sheet 1

INVENTORS: S. G. MILLER
L. STRAUSS
BY Gerard E. Murphy
ATTORNEY

REGENERATIVE SWEEP CIRCUITS USING FIELD EFFECT TRANSISTORS

BACKGROUND OF THE INVENTION

1. Field of the Invention

This invention relates to circuits for producing linear sweep waveforms and, more particularly, to regenerative sweep circuits that use field effect transistors to produce linear voltage sweep waveforms.

2. Description of the Prior Art

A wide variety of circuits for producing a voltage that varies linearly with time are known in the prior art. These circuits are useful in many different applications such as, for example, horizontally deflecting the electron beam of a cathode ray tube at a uniform speed, and developing a sweep frequency signal by providing a linear sweep voltage to a signal generator whose output frequency is a function of its input voltage.

One circuit which has been used extensively by the prior art to provide this kind of linear voltage sweep output is the pentode phantastron. While this circuit provides all of the aforementioned desirable features, it is not compatible with modern techniques of circuit fabrication such as the use of integrated circuitry. This has led to attempts to develop sweep circuitry which is suitable for implementation by solid-state circuitry. One example of these efforts is described in an article entitled "Phantastron Circuits Using Transistors" by N. C. Hekimian in the Feb. 24, 1961 issue of *Electronics* magazine. Other examples of solid-state sweep circuitry, including the use of junction field effect transistors, may be found in Chapter 6, "Linear Voltage Sweeps", of the well-known text *Wave Generation and Shaping*, Second Edition, copyright 1970 by McGraw-Hill, Inc., written by Professor Leonard Strauss, one of the joint inventors of the instant invention. However, none of these prior art efforts is able to achieve an accurate duplication of the desirable phantastron regenerative sweep waveform by circuitry suitable for fabrication by modern techniques such as large-scale integration.

Therefore, it is an object of this invention to develop a regenerative sweep waveform.

It is a specific object of this invention to develop a regenerative sweep waveform by using solid-state circuitry.

It is a more specific object of this invention to provide a regenerative sweep waveform of the Miller sweep type by using metal oxide semiconductor field effect transistors.

SUMMARY OF THE INVENTION

These and other objects are achieved in accordance with this invention by a circuit comprising a capacitor, three field effect transistors, illustratively of the metal oxide semiconductor type (MOSFETs), and other well-known components. Two of the MOSFETs are connected as a pair which controls the nature of the feedback in the circuit. The circuit maintains a constant output voltage while it is in its steady state. The application of a trigger pulse to the circuit causes the MOSFET pair to drive the circuit into a positive feedback region causing it to switch state. This switching action drives the circuit into a negative feedback region such that the capacitor begins charging linearly, thereby providing a Miller sweep output voltage. This sweep region ends when the MOSFET pair switches the circuit back into a positive feedback region causing it to return to its steady state.

DETAILED DESCRIPTION

Figure 1:
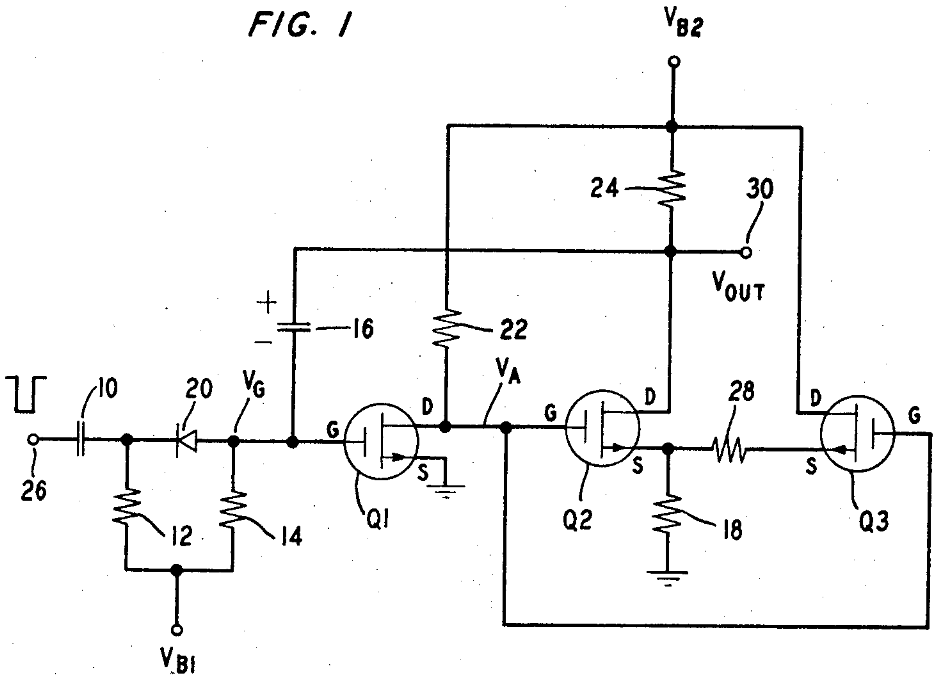
FIG. 1 is a schematic diagram of a first circuit embodying the novel principles of this invention.
Figure 3:
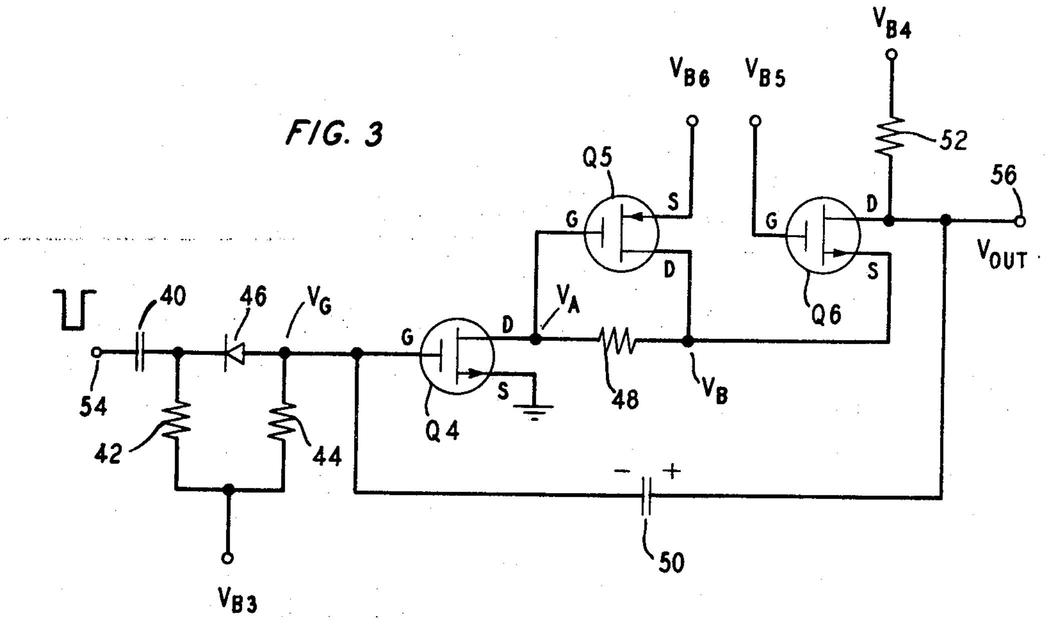
FIG. 3 is a schematic diagram of a second circuit embodying the novel principles of this invention.
Figure 5:
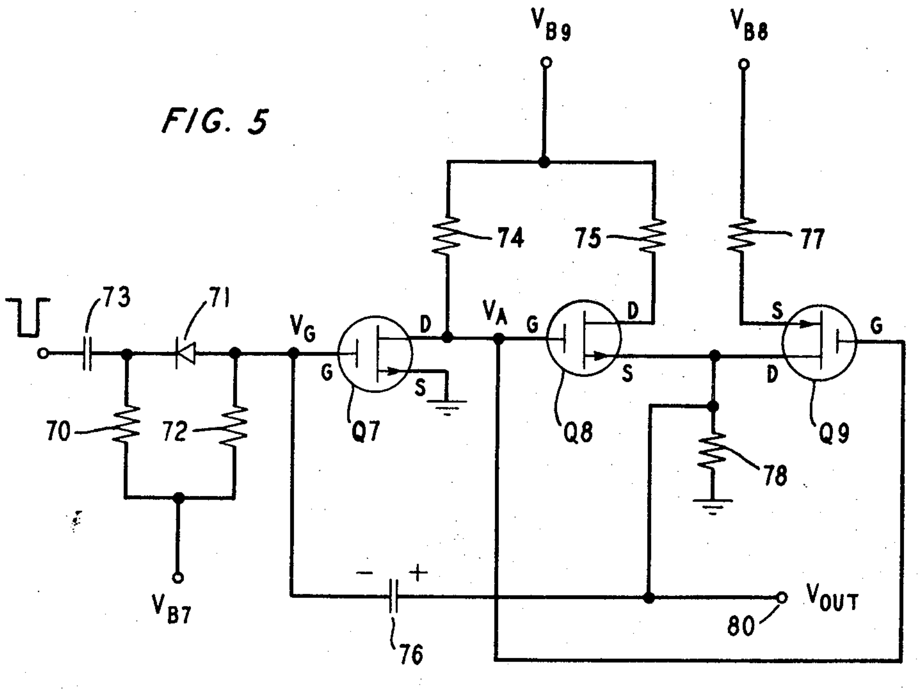
FIG. 5 is a schematic diagram of a third circuit embodying the novel principles of this invention.

The principles of the instant invention can best be understood by considering the three circuits shown schematically in FIGS. 1, 3, and 5 in the drawing. In each of these three circuits, a pair of MOSFETs is biased so that it will, in response to an input trigger pulse, automatically change the overall feedback of the circuit from positive to negative and back to positive at the appropriate point in the operation. This pair comprises transistors Q2 and Q3 in the circuit of FIG. 1, transistors Q5 and Q6 in the circuit of FIG. 3, and transistors Q8 and Q9 in the circuit of FIG. 5. The positive feedback is introduced to switch the circuit into and out of the Miller sweep region. The negative feedback serves to linearize the voltage sweep.

Figure 2:
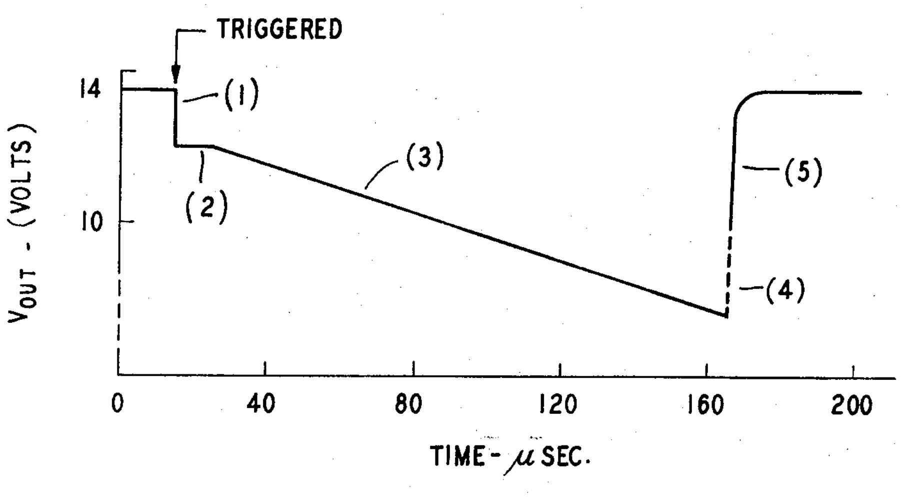
FIG. 2 is a diagram illustrating the output voltage which the circuit of FIG. 1 generates in response to an input trigger pulse.

Turning then to the circuit shown in FIG. 1, this circuit can best be understood in conjunction with FIG. 2, which shows the manner in which the output voltage of the circuit varies with time when a trigger pulse is applied to the circuit.

Prior to the input of the trigger pulse, the circuit will be in its steady state with transistor Q1 ohmic, transistor Q2 near cutoff, and transistor Q3 in its constant-current region. These steady state conditions are the result of the illustrative values of bias voltages and component values set forth below in Table I and the following well-known relationships which govern the operation of MOSFETs.

A MOSFET has three regions of operation: the cutoff region; the ohmic region; and the constant-current region. In the cutoff region, the drain current is essentially zero. In N-channel MOSFETS such as those shown in FIG. 1, the drain current is increased by increasing the gate-source voltage. To cut off the drain current it is necessary to make the gate-source voltage less than the threshold voltage value, the threshold voltage value being a device characteristic. In the ohmic region, the drain current varies linearly with the drain-source voltage. The transistor in in the ohmic region when $$V_{DS} < V_{GS} - V_{TH}, \tag{1}$$

where $V_{DS}$ is the drain-source voltage, $V_{GS}$ is the gate-source voltage, and $V_{TH}$ is the device threshold voltage. In the constant-current region, the drain current remains essentially fixed for varying values of drain-source voltage. The transistor is in the constant-current region when $$V_{DS} > V_{GS} - V_{TH}. \quad (2)$$

Referring again to FIG. 1, in the circuit's steady state transistor Q1, as stated above, is in the ohmic region thus causing $V_A$, the drain voltage of transistor Q1, to be near ground. This value of $V_A$ in combination with $V_{B2}$, the constant potential source connected to transistor Q3, causes transistor Q3 to be in its constant-current region. The drain current of transistor Q3 creates a voltage drop across resistor 18. The potential across resistor 18, in combination with $V_A$, causes the gate-source voltage of transistor Q2 to be near the threshold voltage of transistor Q2, thus keeping transistor Q2 near cutoff. The steady-state polarity of charged capacitor 16 is, as shown in FIG. 1, due to the influence of the bias sources $V_{B2}$ and $V_{B1}$.

This steady state condition changes abruptly when a negative trigger pulse is applied to input terminal 26. The input trigger pulse is coupled to transistor Q1 by capacitor 10 and resistor 12 which serve to differentiate it, thereby producing a positive and a negative voltage spike. Diode 20 insures that only the negative voltage spike is transferred to the gate of transistor Q1. The negative spike causes $V_G$, the gate voltage of transistor Q1, to drop, which in turn causes $V_{out}$ to drop. This almost instantaneous change corresponds to region (1) shown in FIG. 2 and occurs in the following manner.

The negative change in $V_G$ causes transistor Q1 to go from its ohmic region toward its cutoff region, causing $V_A$ to begin to rise. As $V_A$ rises, transistor Q2 is driven from near cutoff towards its ohmic region, causing its drain current to increase, and causing $V_{out}$, the drain voltage of transistor Q2 which had been close to the value of the $V_{B2}$ voltage, to begin decreasing. At this time $V_G$ is still decreasing, causing a positive feedback path to be established through capacitor 16, which in turn allows current to flow from the gate of transistor Q1 to the drain of transistor Q2. This current flow starts to discharge capacitor 16 and drive $V_G$ more negative which keeps transistor Q1 cut off.

At the beginning of region (2) $V_G$ has recovered from the trigger pulse and begun to rise. However, transistor Q1 is still cut off, allowing the value of $V_A$ to momentarily stabilize. Since $V_A$ controls the gate voltage of transistors Q2 and Q3, both of which are now in their ohmic regions, both drain currents will temporarily stabilize forcing $V_{out}$ to temporarily stabilize.

During region (2) the still-rising $V_G$ causes transistor Q1 to come out of cutoff into its constant-current region, allowing $V_A$ to begin to decrease and switching transistor Q3 from its ohmic region to its constant-current region. The drain current of transistor Q3 is thereby reduced, resulting in less voltage being dropped across resistor 18, and hence resulting in a decrease in the voltage level of the source of transistor Q2. Since transistor Q2 is ohmic, the voltage level of the drain of transistor Q2 also begins to drop. Further, since the drain of transistor Q2 is connected to output terminal 30, $V_{out}$ begins to drop again. This corresponds to the beginning of region (3) shown in FIG. 2.

In region (3), since $V_{out}$ is dropping while $V_G$ is rising, a negative feedback path is established through capacitor 16. This negative feedback causes capacitor 16 to continue to discharge. This results in a current passing from the gate of transistor Q1 toward the drain of transistor Q2. The interaction between the drain currents of transistors Q2 and Q3 causes the discharge current of capacitor 16 to be nearly constant. This comprises a Miller sweep which results in $V_{out}$ decreasing linearly with time.

$V_G$ continues to rise during region (3). As $V_G$ rises, the drain current of transistor Q1 increases forcing $V_A$ to decrease. When the combination of a falling $V_A$ and the rising drain-source voltage across transistor Q2 is sufficient to cause equation (2), above, to be satisfied, transistor Q2 goes from its ohmic region into its constant-current region, allowing its drain-source voltage to increase and causing $V_{out}$ to stop decreasing and begin increasing. This is shown as region (4) in FIG. 2.

The voltage gain of Q2 in its constant-current region changes the negative feedback path through capacitor 16 back into a positive feedback path, reversing the current through capacitor 16 and causing it to charge back up to its steady-state value. This charging current raises $V_G$ and, in fact, makes $V_G$ overshoot its steady-state value. In region (5), then, the circuit slowly returns to its steady state as the charging current through capacitor 16 returns to zero.

In summary, it can be seen that the trigger pulse input to transistor Q1 is inverted and amplified by transistor Q1 and applied to transistors Q2 and Q3. These two transistors then interact to switch the circuit from its steady state through a positive feedback region into its sweep region. During the sweep region, the three transistors interact to draw a constant current from capacitor 16, thereby causing a Miller sweep of $V_{out}$. This sweep ends when the continuing cooperative interaction between transistors Q2 and Q3 causes transistor Q2 to enter its constant-current region which serves to switch the circuit through a positive feedback region to its steady state.

The second circuit embodying the principles of this invention is shown in FIG. 3. Suggested component values and bias voltages for implementing this circuit are given below in Table II. The manner in which the output voltage of this circuit varies with time when a trigger pulse is applied to the circuit is shown in FIG. 4.

The input circuit, comprising capacitor 40, diode 46, and resistors 42 and 44, serves to receive and differentiate the input trigger pulse in the same manner as the corresponding components in FIG. 1. Thus the trigger pulse causes $V_G$, the gate voltage of transistor Q4, to decrease which in turn forces $V_A$, the voltage of the drain of transistor Q4, to rise, causing the circuit to enter region (A) shown in FIG. 4.

As $V_A$ rises, the gate-source voltage of transistor Q5 rises. Since transistor Q5 is a P-channel device and is ohmic, this causes the drain current of transistor Q5 to decrease, allowing $V_B$, the drain voltage of transistor Q5 and the source voltage of Q6, to fall. As $V_B$ falls, the gate-source voltage of transistor Q6 increases, causing the drain current to increase, which in turn causes $V_{out}$, the voltage level of the drain of Q6, to begin dropping because the current increase causes more of the voltage of supply $V_{B4}$ to be dropped across resistor 52. Since at this time both $V_G$ and $V_{out}$ are decreasing, a positive feedback path through capacitor 50 back to the gate of transistor Q4 exists. This regenerative condition continues until the increasing $V_A$ rises above the threshold level of transistor Q5, causing it to cut off and ending region (A).

Figure 4:
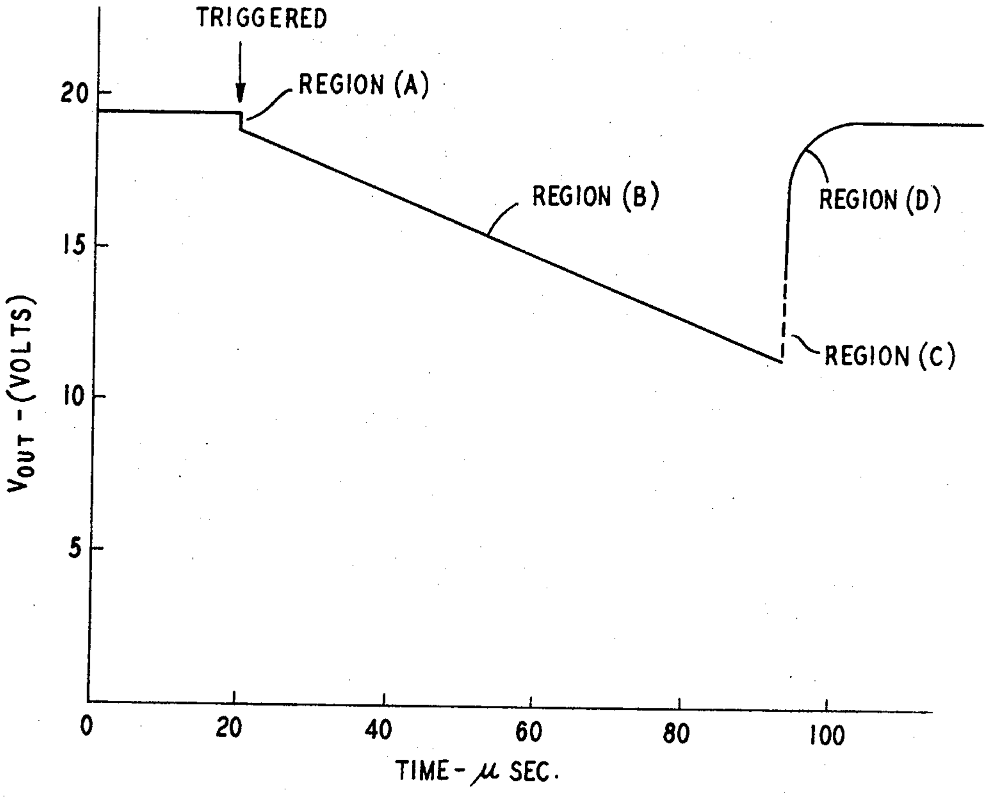
FIG. 4 is a diagram illustrating the output voltage which the circuit of FIG. 3 generates in response to an input trigger pulse.

In region (B) shown in FIG. 4, the trigger input is gone and $V_G$ is rising back towards its steady-state value, forcing $V_A$ to drop. Transistor Q5 is still cut off and remains so during sweep region (B). The falling $V_A$ allows the gate-source voltage of transistor Q6 to rise which in turn increases the drain current of transistor Q6. This causes more of supply voltage $V_{B4}$ to be dropped across resistor 52, forcing $V_{out}$ to continue to fall. A negative feedback path is thus established from $V_{out}$ through capacitor 50 back to the gate of transistor Q4. The interaction between transistors Q4 and Q6 causes a constant current to flow from the gate of Q4 to the drain of Q6 as capacitor 50 tries to charge from its positive value to a lesser value. This causes the linear Miller sweep of region (B).

The charging of capacitor 50 ends, hence ending region (B), when the falling $V_A$ has finally lowered the gate-source voltage of transistor Q5 below its threshold causing it to come out of cutoff into its constant-current region. This allows the drain current of transistor Q5 to flow which increases $V_B$ and decreases the gate-source voltage of transistor Q6, which in turn decreases the drain current of transistor Q6. The voltage drop across resistor 52 then decreases, causing $V_{out}$ to rise. Since $V_G$ is still rising, capacitor 50 becomes part of a positive feedback path from $V_{out}$ to $V_G$, causing a regenerative action corresponding to region (C) in FIG. 4. The rising $V_{out}$ pulls $V_G$ up past its steady-state value. This recovery of capacitor 50 as it charges to its steady-state value corresponds to region (D) in FIG. 4.

In summary, it can be seen that the trigger pulse input to transistor Q4 is inverted and amplified by transistor Q4 and applied to transistors Q5 and Q6. These two transistors then interact to switch the circuit from its steady state through a positive feedback region into its sweep region. During the sweep region, the three transistors interact to draw a constant current from capacitor 50, thereby causing a Miller sweep of $V_{out}$. This sweep ends when the continuing cooperative interaction between transistors Q5 and Q6 causes transistor Q5 to enter its constant-current region which serves to switch the circuit through a positive feedback region back to its steady state.

The third circuit embodying the principles of this invention is shown in FIG. 5. Suggested component values and bias voltages for implementing this circuit are listed below in Table III. The manner in which the output voltage of this circuit varies with time when a trigger pulse is applied to the circuit is shown in FIG. 6.

The input circuit, comprising capacitor 73, diode 71, and resistors 70 and 72, serves to receive and differentiate the input trigger pulse in the same manner as the corresponding components in FIGS. 1 and 3. Thus the trigger pulse causes $V_G$, the gate voltage of transistor Q7, to decrease which in turn forces $V_A$, the drain voltage of transistor Q7, to rise, causing the circuit to enter region ($\alpha$) shown in FIG. 6.

As $V_A$ rises, the gate-source voltage of P-channel transistor Q9 also rises, allowing the drain current of transistor Q9 to decrease. This decreases the voltage drop across resistor 78, hence forcing $V_{out}$, the voltage level of output terminal 80, to fall. $V_{out}$ falling while $V_G$ is rising causes a positive feedback path from $V_{out}$ to $V_G$ to be established through capacitor 76. This regenerative action, shown as region ($\alpha$) in FIG. 6, ends when $V_A$ rises sufficiently to cause the gate-source voltage of transistor Q9 to exceed the threshold voltage of transistor Q9, thus cutting transistor Q9 off. At this point the rising $V_A$ has also caused transistor Q8 to go from cutoff, its steady state condition, into its constant-current region.

Figure 6:
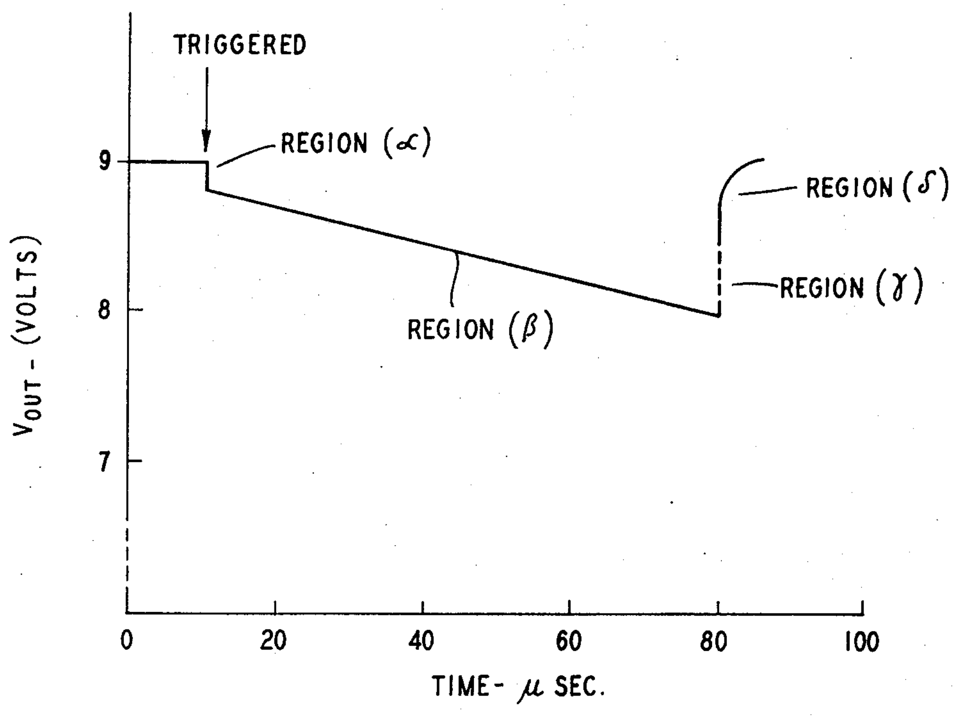
FIG. 6 is a diagram illustrating the output voltage which the circuit of FIG. 5 generates in response to an input trigger pulse.

At the beginning of region ($\beta$) shown in FIG. 6, $V_G$ begins rising toward its steady-state value, which in turn causes $V_A$ to decrease, causing the drain current of transistor Q8 to decrease. This in turn causes the voltage drop across resistor 78 to decrease and hence $V_{out}$ decreases. This establishes a negative feedback path from $V_G$ to $V_{out}$ causing capacitor 76 to begin charging from its positive value to a more negative value, resulting in the Miller sweep depicted as region ($\beta$).

Transistor Q9 remains cut off during region ($\beta$) until the falling $V_A$ causes its gate-source voltage to become less than its threshold voltage. This causes transistor Q9 to switch from cutoff to its constant current region. This switching action increases the current through resistor 78 forcing $V_{out}$ to go up. Since $V_G$ is still rising, capacitor 76 becomes part of a positive feedback path from $V_{out}$ to $V_G$. This causes the regenerative action corresponding to region ($\gamma$) of FIG. 6. The rising $V_{out}$ pulls $V_G$ up past its steady-state value, thus slowing the rate at which capacitor 78 can charge back up to its steady-state value. This recovery of capacitor 78 to its steady-state value corresponds to region ($\delta$) in FIG. 6.

In summary, it can be seen that the trigger pulse input to transistor Q7 is inverted and amplified by transistor Q7 and applied to transistors Q8 and Q9. These two transistors then interact to switch the circuit from its steady state through a positive feedback region into its sweep region. During the sweep region, the three transistors interact to draw a constant current from capacitor 76, thereby causing a Miller sweep of $V_{out}$. This sweep ends when the continuing cooperative interaction between transistors Q8 and Q9 causes transistor Q9 to enter its constant-current region which serves to switch the circuit through a positive feedback region back to its steady state.

The three circuits described above may be implemented with the component values and bias voltages listed in the following three Tables.

TABLE I

SUGGESTED COMPONENTS FOR THE CIRCUIT OF FIG. 1

| Component | Value |
|---|---|
| Capacitor 10 | 0.34 microfarads |
| Resistor 12 | 1 kilohm |
| Resistor 14 | 110 kilohms |
| Supply Voltage $V_{B1}$ | −1.20 volts |
| Diode 20 | 1N914B |
| Transistor Q1 | 40673 ($V_{TH}$ = −1.38 volts) |
| Transistor Q2 | 3N139 ($V_{TH}$ = −3.5 volts) |
| Transistor Q3 | 3N139 ($V_{TH}$ = −5.0 volts) |
| Capacitor 16 | 0.05 microfarads |
| Resistor 18 | 8.2 kilohms |
| Resistor 22 | 100 kilohms |
| Resistor 24 | 32 kilohms |
| Resistor 28 | 1.5 kilohms |
| Supply Voltage $V_{B2}$ | 15 volts |
| Capacitor 40 | 0.1 microfarads |
| Resistor 42 | 920 ohms |
| Resistor 44 | 100 kilohms |
| Supply Voltage $V_{B3}$ | 0 volts |
| Diode 46 | 1N914B |
| Transistor Q4 | 40673 ($V_{TH}$ = −1.0 volts) |
| Transistor Q5 | 2N4352 ($V_{TH}$ = −3.0 volts) |
| Transistor Q6 | 3N139 ($V_{TH}$ = −4.5 volts) |
| Resistor 48 | 4.7 kilohms |
| Capacitor 50 | 0.05 microfarads |

| | |
|---|---|
| Resistor 52 | 56 kilohms |
| Supply Voltage $V_{B4}$ | 25 volts |
| Supply Voltage $V_{B5}$ | 5.12 volts |
| Supply Voltage $V_{B6}$ | 9.33 volts |

TABLE III

SUGGESTED COMPONENTS FOR THE CIRCUIT OF FIG. 5

| Component | Value |
|---|---|
| Resistor 70 | 1 kilohm |
| Resistor 72 | 100 kilohms |
| Diode 71 | 1N914B |
| Transistor Q7 | 40673 ($V_{TH}$ = −1.0 volts) |
| Transistor Q8 | 3N139 ($V_{TH}$ = −3.6 volts) |
| Transistor Q9 | 2N4352 ($V_{TH}$ = −3.0 volts) |
| Capacitor 73 | 0.1 microfarads |
| Resistor 74 | 100 kilohms |
| Resistor 75 | 4.7 kilohms |
| Capacitor 76 | 0.05 microfarads |
| Resistor 77 | 5 kilohms |
| Resistor 78 | 56 kilohms |
| Supply Voltage $V_{B7}$ | −0.6 volts |
| Supply Voltage $V_{B8}$ | 10 volts |
| Supply Voltage $V_{B9}$ | 20 volts |

These Tables in combination with FIGS. 1, 3, and 5 characterize the three circuits which are illustrative examples of the present invention. This is not to be construed as a limitation on the multiple uses to which the present invention can be put by using field effect transistors having characteristics similar to the specific transistors listed above, by using both P-channel and N-channel devices, by providing different values of bias voltages, and by substituting other components to achieve different operating voltages and times. For example, the resistors shown in FIGS. 1, 3, and 5 might be implemented by using MOSFETs biased to function as resistors, thereby allowing the entire circuit to be fabricated more easily using integrated circuit fabrication techniques. It will be obvious to those of ordinary skill in the art from a reading of the above circuit descriptions how such changes may be made without departing from the spirit and scope of the invention.

What is claimed is:

1. A circuit having a steady-state region and a Miller sweep region of operation for developing a regenerative sweep signal at the output terminal of said circuit comprising:

- a first field effect transistor responsive to an applied signal for initiating said sweep signal;
- a second field effect transistor, responsive to the output signal of said first field effect transistor, for switching said circuit from said steady-state region into said Miller sweep region;
- a capacitor connected between said output terminal and the input of said first transistor; and
- a third field effect transistor responsive to the output signals of said first and second transistors and having said circuit output terminal connected to the output thereof for cooperating with said first and second transistors so as to draw a substantially constant current through said capacitor, thereby causing the voltage of said output terminal to change linearly with time.

2. A circuit for developing a regenerative sweep signal in response to an applied trigger pulse comprising:

- a first field effect transistor for inverting and amplifying said applied trigger pulse;
- a second field effect transistor connected to the output of said first transistor; and
- a third field effect transistor connected to the outputs of said first and second transistors, said third transistor interacting with said second transistor to produce a first unstable region of positive feedback in said circuit in response to said inverted and amplified trigger pulse, said circuit responsively switching into a negative feedback region, said third transistor also interacting with said second transistor to switch said circuit out of said negative feedback region by producing a second unstable region of positive feedback in said circuit a preselected time after said switching of said circuit into said negative feedback region.

3. The circuit of claim 2 wherein said field effect transistors are metal oxide semiconductor field effect transistors.

4. The circuit of claim 3 wherein said second positive feedback region is produced by said second metal oxide semiconductor field effect transistor entering its constant-current region.

5. The circuit of claim 3 wherein said second positive feedback region is produced by said third metal oxide semiconductor field effect transistor entering its constant-current region.

6. The circuit of claim 3 wherein a capacitor is connected between said first metal oxide semiconductor field effect transistor and said third metal oxide semiconductor field effect transistor.

7. The circuit of claim 3 wherein a capacitor is connected between said first metal oxide semiconductor field effect transistor and said second metal oxide semiconductor field effect transistor.

8. A field effect transistor regenerative sweep circuit comprising:

- a first source of constant potential;
- a first field effect transistor having a gate, a source, and a drain, said gate being connected to said first source of constant potential;
- a second source of constant potential;
- a first resistor connected between said drain of said first transistor and said second source of constant potential;
- a second field effect transistor having a gate, a source, and a drain, said gate being connected to said drain of said first transistor;
- a second resistor connected between said drain of said second transistor and said second source of constant potential;
- a third resistor connected between said source of said second transistor and a fixed potential;
- a third field effect transistor having a drain which is connected to said second source of constant potential, a gate which is connected to said gate of said second transistor, and a source which is connected to said source of said second transistor; and
- a capacitor connected between said drain of said second transistor and said gate of said first transistor.

9. The circuit of claim 8 wherein said field effect transistors are metal oxide semiconductor field effect transistors.

10. The circuit of claim 9 wherein said metal oxide semiconductor field effect transistors are of the N-channel type.

11. A field effect transistor regenerative sweep circuit comprising:

- a first source of constant potential;
- a first field effect transistor having a gate, a source, and a drain, said gate of said first transistor being connected to said first source of constant potential;

a second source of constant potential;
a second field effect transistor having a gate, a source, and a drain, said gate being connected to said drain of said first transistor, and said source being connected to said second source of constant potential;
a first resistor connected between said drain of said first transistor and said drain of said second transistor;
a third source of constant potential;
a third field effect transistor having a gate, a source, and a drain, said gate being connected to said third source of constant potential, and said source being connected to said drain of said second transistor;
a fourth source of constant potential;
a second resistor connected between said fourth source of constant potential and said drain of said third transistor; and
a capacitor connected between said drain of said third transistor and said gate of said first transistor.

12. The circuit of claim 11 wherein said field effect transistors are metal oxide semiconductor field effect transistors.

13. The circuit of claim 12 wherein said first and said third metal oxide semiconductor field effect transistors are of the N-channel type and said second metal oxide semiconductor field effect transistor is of the P-channel type.

14. A field effect transistor regenerative sweep circuit comprising:
a first source of constant potential;
a first field effect transistor having a gate, a source, and a drain, said gate being connected to said first source of constant potential;
a second source of constant potential;
a first resistor connected between said second source of constant potential and said drain of said first transistor;
a second field effect transistor having a gate, a source, and a drain, said gate being connected to said drain of said first transistor;
a second resistor connected between said second source of constant potential and said drain of said second transistor;
a third source of constant potential;
a third field effect transistor having a gate, a source, and a drain, said drain being connected to said source of said second transistor and said gate of said third transistor being connected to said gate of said second transistor;
a third resistor connected between said third source of constant potential and said source of said third transistor;
a common terminal of fixed potential connected to said source of said first transistor;
a fourth resistor connected between said common terminal and said source of said second transistor; and
a capacitor connected between said source of said second transistor and said gate of said first transistor.

15. The circuit of claim 14 wherein said field effect transistors are metal oxide semiconductor field effect transistors.

16. The circuit of claim 15 wherein said first and said second metal oxide semiconductor field effect transistors are of the N-channel type and said third metal oxide semiconductor field effect transistor is of the P-channel type.

17. A circuit for developing a regenerative sweep signal comprising:
a common terminal of fixed potential;
a first metal oxide semiconductor field effect transistor having a gate, a source, and a drain, said source being connected to said common terminal;
a second metal oxide semiconductor field effect transistor having a gate, a source, and a drain, said gate being connected to said drain of said first transistor, and said source being resistively connected to said common terminal;
a third metal oxide semiconductor field effect transistor having a gate, a source, and a drain, said gate being connected to said drain of said first transistor, and said source being resistively connected to said source of said second transistor; and
a capacitor connected between said drain of said second transistor and said gate of said first transistor.

18. The circuit of claim 17 further comprising:
biasing means connected to the drains of said transistors.

19. A circuit for developing a regenerative sweep signal comprising:
a common terminal of fixed potential;
a first metal oxide semiconductor field effect transistor having a gate, a source, and a drain, said source being connected to said common terminal;
a second metal oxide semiconductor field effect transistor having a gate, a source, and a drain, said gate being connected to said drain of said first transistor and said drain being resistively connected to said drain of said first transistor;
a third metal oxide semiconductor field effect transistor having a gate, a source, and a drain, said source being connected to said drain of said second transistor; and
a capacitor connected between said drain of said third transistor and said gate of said first transistor.

20. The circuit of claim 19 further comprising:
a first source of constant potential connected to said source of said second transistor;
a second source of constant potential connected to said gate of said third transistor; and
a third source of constant potential connected to said drain of said third transistor.

21. A circuit for developing a regenerative sweep signal comprising:
a common terminal of fixed potential;
a first metal oxide semiconductor field effect transistor having a gate, a source, and a drain, said source being connected to said common terminal;
a second metal oxide semiconductor field effect transistor having a gate, a source, and a drain, said gate being connected to said drain of said first transistor and said source being resistively connected to said common terminal;
a third metal oxide semiconductor field effect transistor having a gate, a source, and a drain, said gate being connected to said drain of said first transistor and said drain being resistively connected to said common terminal; and
a capacitor connected between said source of said second transistor and said gate of said first transistor.

22. The circuit of claim 21 further comprising:
a first source of constant potential resistively connected to said drain of said first transistor and resistively connected to said drain of said second transistor; and
a second source of constant potential resistively connected to said source of said third transistor.

* * * * *